US010255810B2

United States Patent
Hearn

(10) Patent No.: US 10,255,810 B2
(45) Date of Patent: Apr. 9, 2019

(54) METHOD AND SYSTEM FOR A MOTOR VEHICLE

(71) Applicant: FORD GLOBAL TECHNOLOGIES, LLC, Dearborn, MI (US)

(72) Inventor: David Hearn, Chelmsford Essex (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/942,670

(22) Filed: Apr. 2, 2018

(65) Prior Publication Data

US 2018/0286241 A1 Oct. 4, 2018

(30) Foreign Application Priority Data

Mar. 31, 2017 (GB) .................................. 1705195.4

(51) Int. Cl.
*G08G 1/16* (2006.01)
*H04N 13/204* (2018.01)
*G06K 9/00* (2006.01)
*B60Q 9/00* (2006.01)

(52) U.S. Cl.
CPC .............. *G08G 1/16* (2013.01); *B60Q 9/008* (2013.01); *G06K 9/00798* (2013.01); *H04N 13/204* (2018.05)

(58) Field of Classification Search
CPC combination set(s) only.
See application file for complete search history.

(56) References Cited

U.S. PATENT DOCUMENTS

| 5,978,724 | A | 11/1999 | Sekine | |
|---|---|---|---|---|
| 6,853,902 | B2* | 2/2005 | Miller | B60T 7/22 180/167 |
| 7,774,121 | B2* | 8/2010 | Lee | B60W 30/045 701/70 |
| 8,892,329 | B2* | 11/2014 | Yasui | B60W 30/146 701/72 |
| 9,776,636 | B2* | 10/2017 | Nakamizo | B60W 30/18 |
| 9,909,881 | B2* | 3/2018 | Denaro | B60W 30/18009 |
| 2002/0087254 | A1 | 7/2002 | Ryoo | |

(Continued)

FOREIGN PATENT DOCUMENTS

DE 102010038970 A1 2/2012

OTHER PUBLICATIONS

GB Combined Search and Examination Report for GB 1 705 195.4, dated Aug. 24, 2017, 6 Pages.

*Primary Examiner* — Travis R Hunnings
(74) *Attorney, Agent, or Firm* — Frank MacKenzie; Brooks Kushman P.C.

(57) ABSTRACT

A method to operate a motor vehicle is provided. The method comprises capturing an image of the road ahead of the vehicle; determining a limit point on a first side of a lane of the road in which the vehicle is travelling, at which the first side appears to substantially converge with a second side of the lane within the image; determining a limit line extending across the road from the limit point in a direction perpendicular to the first and/or second sides of the lane; determining a limit distance between the vehicle and the limit line; determining a stopping distance of the vehicle according to the current speed of the vehicle; and alerting a driver of the vehicle if the stopping distance is greater than the limit distance. A safety system for a vehicle is also provided.

18 Claims, 2 Drawing Sheets

(56) References Cited

U.S. PATENT DOCUMENTS

2008/0059036 A1\* 3/2008 Imai .................... B60W 30/143
                                                      701/93
2014/0207307 A1   7/2014 Jonsson et al.

\* cited by examiner

METHOD AND SYSTEM FOR A MOTOR VEHICLE

CROSS-REFERENCE TO RELATED APPLICATIONS

This application claims foreign priority benefits under 35 U.S.C. § 119(a)-(d) to Application GB 1705195.4 filed Mar. 31, 2017, which is hereby incorporated by reference in its entirety.

TECHNICAL FIELD

The present disclosure relates to a method to operate a motor vehicle when travelling around corners.

BACKGROUND

Many drivers negotiate corners at speeds that are excessively high and may be unsafe.

Advanced drivers may be trained to consider a distance ahead of a vehicle that they are able to see, and control the speed such that they will always be able to bring the vehicle to a stop ahead of any obstacle appearing in the road as the vehicle rounds a corner.

SUMMARY

According to an aspect of the present disclosure, there is provided a method to operate a motor vehicle, the method comprising: capturing an image of a road ahead of the vehicle using a camera provided on the vehicle; determining a limit point on a first side of a lane of the road in which the vehicle is travelling, at which the first side substantially converges with a second side of the lane within the image; determining a limit line extending across the road from the limit point in a direction perpendicular to the first and/or second sides of the lane; determining a limit distance between the vehicle and the limit line; determining a stopping distance of the vehicle according to a current speed of the vehicle; and alerting a driver of the vehicle if a stopping distance is greater than the limit distance.

On a single carriageway road/undivided highway, the first side of the lane may be an edge of the road and the second side of the lane may be a center line on the road, or vice versa. The limit line may be a notional line on the road.

The method may comprise determining which side of the lane is at an inside of a corner in the road visible in the image. The first side may be the side determined to be at the inside of the corner.

The method may comprise determining a further limit point on the second side of the lane at which the first side of the lane appears to substantially converge with the second side within the image. The limit line may pass through a closer of the limit point and the further limit point to the vehicle, e.g. closer in a straight line or along the road.

The method may comprise determining distances from the vehicle to the limit point and the further limit point.

The limit distance may be measured along the road, e.g. parallel to the edge and/or center of the lane/road.

The limit distance may be equal to a distance to be travelled by the vehicle in order to reach the limit line.

The method may comprise determining a limit speed of the vehicle at which the stopping distance is equal to the limit distance. The method may further comprise communicating the limit speed, or a message that the limit speed has been exceeded, to the driver.

The method may comprise determining or predicting when the vehicle is approaching a corner. The other steps of the method may be performed when it is predicted that the vehicle is approaching a corner. The method may comprise delaying other steps of the method until it is determined or predicted that the vehicle is approaching a corner.

According to another aspect of the present disclosure, there is provided software, which, when executed by a computing apparatus, causes the computing apparatus to perform the above-mentioned method.

According to another aspect of the present disclosure, there is provided a safety system for a motor vehicle. The system comprises an imaging device configured to capture an image of a road ahead of the vehicle; and a controller configured to perform the above-mentioned method.

The imaging device may be located adjacent to a position of a driver's head within the vehicle. For example, the imagining device may be located on or in a head rest of the vehicle or a trim portion, such as a ceiling rim portion, adjacent to the head rest.

The imaging device may be configured to capture an image that substantially corresponds to a field of view of a driver of the vehicle. The imaging device may be a 3D camera configured to capture a 3D image of the road ahead of the vehicle, e.g. in which a straight-line distance between the vehicle and the limit points and/or position may be directly determined.

A vehicle may comprise the above-mentioned safety system.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
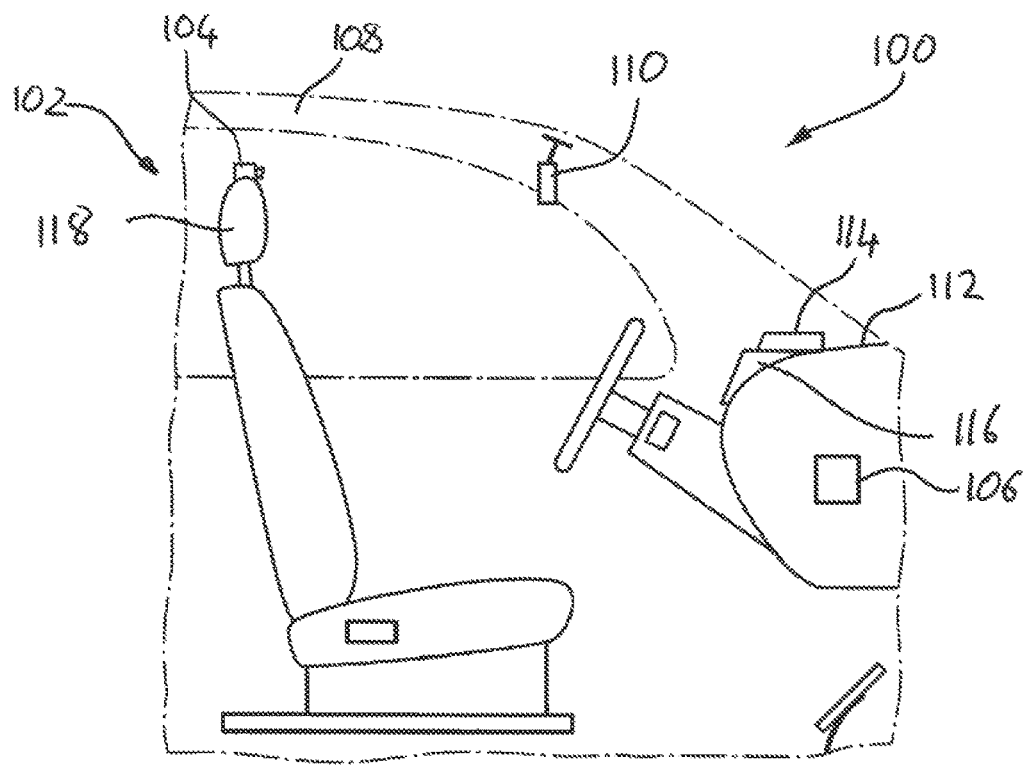
FIG. 1 is a sectional view of a vehicle having a cornering system according to the present disclosure.

With reference to FIG. 1, a vehicle 100 according to arrangements of the present disclosure comprises a cornering safety system 102. The cornering safety system 102 comprises a camera 104 and a controller 106.

The camera 104 is configured to capture an image of a road 12 ahead of the vehicle 100. The camera 104 is configured to capture an image of the road 12 ahead of the vehicle that is similar to, e.g. substantially the same as, a view of a driver of the vehicle. The camera 104 may be positioned close to a location 118 of a driver's head within the vehicle. For example, in the arrangement depicted in FIG. 3, the camera 104 is coupled to a headrest 118 of the vehicle. In other arrangements, the camera 104 may be coupled to a trim portion of the vehicle adjacent to the position of the driver's head, e.g. adjacent to the head rest 118. For example, the camera may be coupled to a ceiling 108 of the vehicle.

In other arrangements, the camera 104 may be located away from the location 118 of the driver's head but may be located along or close to an expected line of sight 8 of the driver to a limit point 110 of the driver's vision. For example, the camera 104 may be provided on a rear-view mirror 110 or on a dashboard 112 of the vehicle. In some arrangements, the camera 14 may be mounted in a position in which it is located close to a surface of the road 12. For example, the camera 14 may be mounted on or within a front bumper (not shown) of the motor vehicle.

Figure 2:
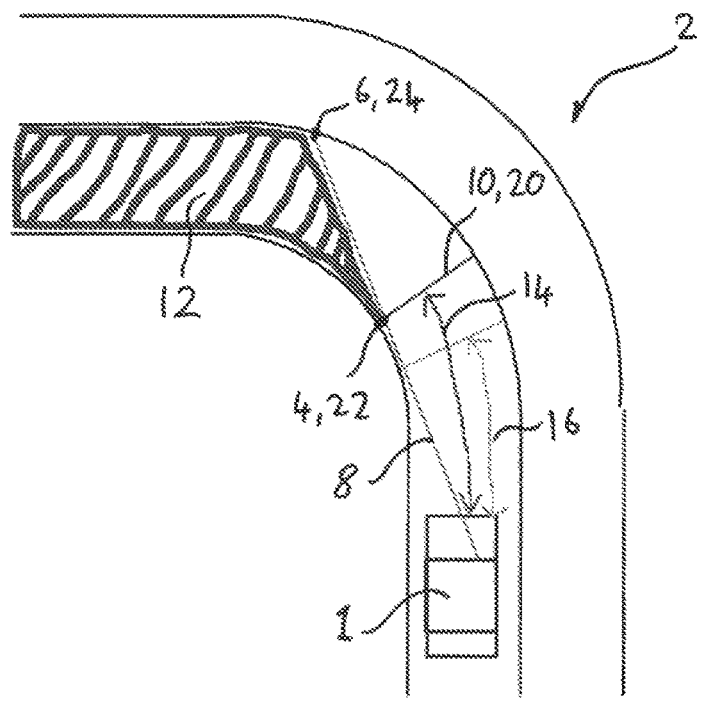
FIG. 2 shows a vehicle travelling at a first speed around a corner.
Figure 3:
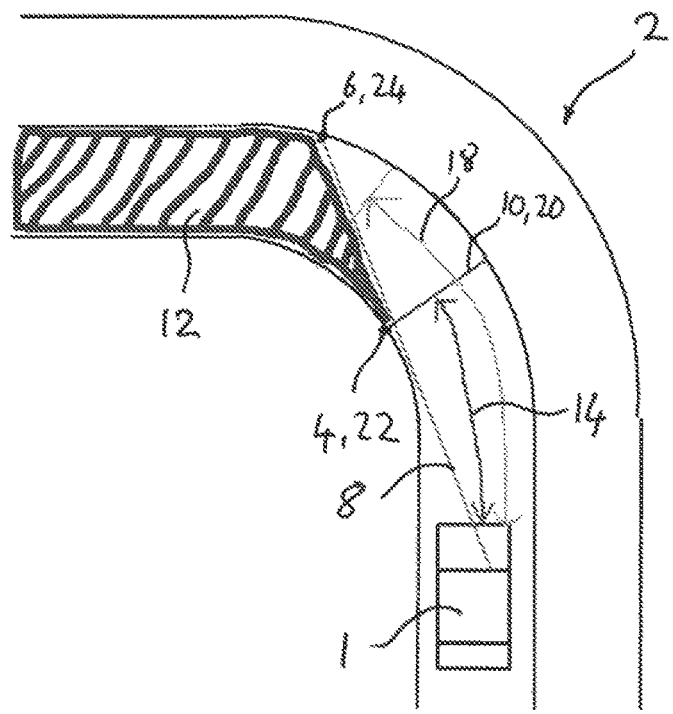
FIG. 3 shows a vehicle travelling at a second speed around a corner.

With reference to FIGS. 2 and 3, one criteria for assessing whether a cornering speed is too high, is to consider whether the driver would be able to bring the vehicle to a stop within a distance that they are able to see ahead of them.

As shown in FIGS. 2 and 3, as a vehicle 1 approaches a corner 2, an edge point 4 at an edge of the road 12 at a particular distance ahead of the vehicle may be seen by the driver to substantially converge with a center point 6 at a center of the road. In other words, a particular line of sight 8 of the driver may substantially intersect with both the point 4 at the edge of the road 4 and the point 6 at the center of the road 12.

The position at which the edge of the road substantially converges with the center of the road in the view of the driver may be referred to as the limit point of the driver's vision 10. Beyond this point, e.g. further along the road 12, an area of the road 12 may exist where any obstacles (not shown) present in the road 12 are not visible to the driver, particularly if there is a barrier, such as a wall or hedge, provided at a side of the road 12.

In the arrangement shown in FIG. 2, the vehicle 1 is travelling at a first speed. When traveling at the first speed, the driver is able to stop the vehicle 1 within a first stopping distance 16. The first stopping distance 16 is less than a distance 14 from the vehicle 1 to the limit point of the driver's vision 10 and hence, the first speed may be considered a safe speed for approaching the corner.

In the arrangement shown in FIG. 3, the vehicle 1 is travelling at a second speed such that the driver is able to stop the vehicle 1 within a second stopping distance 18. As depicted, the second stopping distance 18 is greater than the distance 14 between the vehicle 1 and the limit point of the driver's vision 10. Hence, the driver would not able to bring the vehicle 1 to a stop before the vehicle enters an area of the road 12, in which an obstacle present in the road may not be visible to the driver. When the vehicle 1 is travelling at the second speed, by the time the driver has travelled sufficiently far around the corner, such that they are able to see an obstacle within the area 12, the driver may be unable to bring the vehicle to a stop before colliding with the obstacle.

Figure 4:
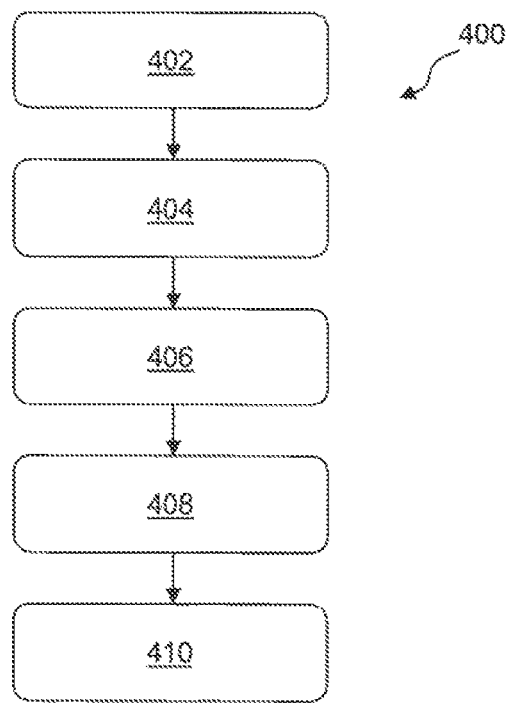
FIG. 4 shows a method to operate a motor vehicle according to the present disclosure.

With reference to FIG. 4, the controller 106 is configured to control operation of the cornering safety system 102, depicted in FIG. 1, according to a method 400, in order to increase safety of the vehicle 100 when travelling around a corner.

The method 400 comprises a first step 402 in which an image of the road 12 ahead of the vehicle is captured using the camera 104. In a second step 406, a limit point 10 is determined by identifying a point on a first edge 4 of a lane 26 of the road 12 in which the vehicle is travelling at which the first edge 4 appears in the image to converge or substantially converge with a second edge 6 of the lane 26.

In the case of a vehicle travelling along a single lane 26, single carriageway/undivided highway the first edge 4 of the lane may be the edge 4 of the road 12 and the second edge 6 of the lane 26 may be the center of the road 12, e.g. defined by a center line 24 marking of the road 12, or vice versa. In the case of the vehicle 1 travelling alone a single lane road 12 or a road 12 without a centerline, the second edge 6 may be an edge of the road, e.g. an opposite edge of the road.

It will be appreciated that in some arrangements, the first and second sides of the lane may not be seen to completely converge with each other within the image captured by the camera. In particular, a distance between the sides of the road within the image may depend on the position, e.g. height, of the camera relative to the surface of the road and the gradient of the road ahead of the vehicle. Hence, the first and second sides of the road may be deemed to converge when a distance between the lines is less than a threshold convergence distance. In some arrangements, it may be desirable to position the camera 104 at a lower height on the vehicle, which may reduce the distance between the sides of the lane within the image.

In a third step 406, a limit position 20 of the driver's vision is determined. The limit position 20 may be considered as a notional line passing through the limit point 10 and extending across the road 12 in a direction perpendicular to the first and/or second edges 4, 6 of the lane 26 of the road 12 in which the vehicle is travelling. The limit position 20 is thereby defined such that the vehicle 1 first enters an area in the road 12, depicted in FIGS. 1 and 2, when the vehicle reaches the limit position 20.

Referring to FIGS. 2 and 3, the limit position 20 may extend from a first limit point 22 defined on a side 28 of the lane 26 of the road at an inside of the corner 2, rather than a second limit point 24 defined on a side 30 of the lane 26 of the road 12 at an outside of the corner 2. The method 400 may comprise a side determination step in which the side 28 of the lane at the inside of the corner 2 is identified and the limit point 22 may be determined, in the second step 404, on the side 28 of the lane at the inside of the corner, e.g. the first side 28 may be at the inside of the corner.

As shown in FIGS. 2 and 3, the first limit point 22 is closer, e.g. in a straight line, to the vehicle 1 than the second limit point 24. Hence, instead of performing the side determination step, the method 400 may comprise a step in which a further limit point is determined on the second side of the lane at which the first side appears to substantially converge with the second side of the lane within the image. The limit position 20 may be determined, e.g. in the third step 406, such that the notional line extends through the closer of the limit point and the further limit point to the vehicle.

Returning to FIG. 4, the method 400 comprises a fourth step 408 in which a limit distance between the vehicle and the limit position is determined. The limit distance may be the distance that is travelled by the vehicle 1 before the vehicle 1 reaches the limit position. Hence, the limit distance may be measured along the road, e.g. parallel to the first and/or second sides of the road lane.

The camera 104 depicted in FIG. 1 may be a 3D camera configured to capture a 3D image in which the distances, such as the distance to the first and second limit points, may be directly determined. The fourth step 408 may be performed by referring to distance information captured in the 3D image. Additionally or alternatively, the limit distance may be determined by considering the size of features within the image, such as the thickness of road markings at the first and or second limit points, in order to determine the distance to the limit position.

As mentioned above, the first and second sides of the lane may not be seen to completely converge within each other at the limit point within the image captured by the camera 104. The distance between the first and second sides may depend on the position, e.g. height, of the camera 104 relative to the surface of the road and the gradient of the road. In some arrangements, the controller 102 may be configured to process the image, e.g. the 3D image, captured by the camera and transform the image in order to provide a representation of the road relative to a position on the surface of the road, e.g. to provide an image that appears to have been captured by a camera positioned at and aligned with the surface of the road. Transforming the image in this way may allow the threshold convergence distance, at which the first and second sides are deemed to converge, to be reduced.

In a fifth step 410 of the method 400, a stopping distance of the vehicle is determined. The stopping distance is determined according to a current speed of the vehicle and may include a thinking distance, corresponding to the distance travelled between a time an obstacle becomes visible to the driver and when the driver begins braking, and a braking distance, corresponding to the distance over which the vehicle is expected to stop after the brakes have been applied.

The method 400 further comprises a sixth step 412 in which the driver of the vehicle is alerted if the stopping distance is greater than the limit distance. The cornering safety system may comprise a user interface device such as a speaker 114 or a display screen 116 and the driver may be alerted by the speaker 114 or display screen 116. In some arrangements, the controller 106 may be operatively coupled to an entertainment system or an on-board computer system of the vehicle 100 and may operate speakers or a display screen provided as part of the entertainment or on-board computer systems of the vehicle in order to alert the driver.

The method 400 may comprise a speed determination step in which a limit speed of the vehicle is determined at which the stopping distance is equal to the limit distance. The limit speed may be communicated to the driver, e.g. displayed using the display screen 116 or communicated using the speaker 114.

In some arrangements, the vehicle may reduce its speed without intervention from the driver, e.g. automatically, such that the speed of the vehicle is less than or equal to the limit speed.

The method 400 may be repeated as the vehicle travels towards and around the corner. For example, the method 400 may be repeated throughout the corner or after a predetermined period of time or distance. If the cornering safety system begins to alert the driver that the stopping distance of the vehicle is more than the limit distance, e.g. during a particular time that the method 400 is performed, the cornering safety system may continue to alert the driver until the method 400 has been repeated and it has been determined that the limit distance is equal to or greater than the stopping distance.

The method 400 may be most beneficially performed when the vehicle 100 is currently approaching a corner in the road. The method 400 may comprise a corner detection step in which it is determine or predicted whether the vehicle 100 is currently approaching a corner in the road.

The corner detection step may be performed by capturing an image ahead of the vehicle, e.g. using the camera 104 or another camera, and determining a change in direction of the road within the image. Alternatively, the corner detection step may be performed by referring to a navigation system provided on the vehicle and identifying whether the vehicle is approaching or is likely to approach a corner.

The corner detection step may be performed before the other steps of the method 400 described above. If is it determined or predicted that the vehicle is approaching a corner in the road, the remaining steps of the method 400 may be performed. Otherwise, the remaining steps of the method may be delayed, e.g. until it is determined or predicted that the vehicle is approaching a corner.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method to operate a vehicle, the method comprising:
    capturing an image of a road ahead using a camera;
    determining a limit point on a first side of a travelling lane of the road, at which the first side substantially converges with a second side of the lane within the image;
    determining a limit line extending across the road from the limit point in a direction perpendicular to the first and second sides of the lane;
    determining which side of the lane is at an inside of a corner in the road visible in the image, wherein the first side is a side determined to be at the inside of the corner;
    determining a further limit point on the second side of the lane at which the first side of the lane appears to substantially converge with the second side within the image, wherein the limit line passes through a closer of the limit point and the further limit point to the vehicle;
    determining a limit distance between the vehicle and the limit line;
    determining a stopping distance according to a current vehicle speed; and
    alerting a driver if the stopping distance is greater than the limit distance.

2. The method of claim 1, wherein the limit distance is measured along the road.

3. The method of claim 1, wherein the limit distance is equal to a distance to be travelled to reach the limit line.

4. The method of claim 1 further comprising:
    determining a limit speed of the vehicle at which the stopping distance is equal to the limit distance.

5. The method of claim 4 further comprising:
communicating the limit speed to the driver.

6. The method of claim 1 further comprising:
predicting when the vehicle is approaching a corner.

7. The method of claim 6 further comprising:
alerting the driver until it is determined that the vehicle is approaching a corner.

8. A vehicle safety system comprising:
a camera configured to capture an image of a road ahead; and
a controller configured to, in response to identifying a limit line extending, in a direction perpendicular to first and second sides of a lane, across the road from a limit point on the first side at an inside of a corner that substantially converges with a second side of the lane within the image, and a further limit point on the second side, the limit line passing through a closer of the limit point and the further limit point, calculate a limit distance between the vehicle and the limit line and a stopping distance according to a current vehicle speed and alert a driver if the stopping distance is greater than the limit distance.

9. The vehicle safety system of claim 8, wherein the camera is located adjacent to a position of a headrest.

10. The vehicle safety system of claim 8, wherein the camera is configured to capture an image that substantially corresponds to a field of view of a driver.

11. The vehicle safety system of any of claim 8, wherein the camera is a 3D camera configured to capture a 3D image of the road ahead of the vehicle.

12. The vehicle safety system of claim 8, wherein the limit distance is equal to a distance to be travelled to reach the limit line.

13. The vehicle safety system of claim 8, wherein the controller is further configured to determine a vehicle speed limit at which the stopping distance is equal to the limit distance.

14. A vehicle comprising:
a camera capturing an image of a lane; and
a controller determining a line of sight passing through a first point on a first lane side and a vision limit point on a second lane side, and a limit line perpendicular to the lane at the first point, wherein the controller signals an alert if a stopping distance for a current vehicle speed is greater than the distance to the limit line.

15. The vehicle of claim 14, wherein the camera is located adjacent to a position of a headrest.

16. The vehicle of claim 14, wherein the camera is configured to capture an image that substantially corresponds to a field of view of a driver.

17. The vehicle of claim 14, wherein the controller is further configured to delay signaling the alert until the vehicle approaches a corner.

18. The vehicle of claim 14, wherein the distance to the limit line is equal to a travelled distance to reach the line.

* * * * *